United States Patent [19]
Aoyama

[11] Patent Number: 5,807,173
[45] Date of Patent: Sep. 15, 1998

[54] METHOD FOR PERFORMING DERIVATIVE SCENARIO IN GAME PROGRAM

[75] Inventor: Koji Aoyama, Hokkaido, Japan

[73] Assignee: Hudson Soft Co., Ltd., Hokkaido, Japan

[21] Appl. No.: 768,108

[22] Filed: Dec. 16, 1996

[30] Foreign Application Priority Data

Dec. 25, 1995 [JP] Japan ................................. 7-350905

[51] Int. Cl.⁶ ..................................................... A63F 9/22
[52] U.S. Cl. ............................................................ 463/23
[58] Field of Search ................................ 463/23, 24, 36, 463/30, 31, 7, 43, 44, 45, 40

[56] References Cited

U.S. PATENT DOCUMENTS 5,267,734 12/1993 Stamper et al. .
5,474,453 12/1995 Copperman .
5,604,855 2/1997 Crawford .
5,672,107 9/1997 Clayman ................................... 463/36

Primary Examiner—George Manuel
Attorney, Agent, or Firm—McDermott, Will & Emery

[57] ABSTRACT

Disclosed is a method for performing a derivative scenario in a game program operated on a home television game machine, has the steps of generating the plurality of derivative scenarios in the process of real time proceeded by a timer means with which a main body or an external storage device of the home television game machine is provided, and performing the plurality of derivative scenarios such that each of the plurality of derivative scenarios circulatively changes every a time period.

6 Claims, 3 Drawing Sheets

METHOD FOR PERFORMING DERIVATIVE SCENARIO IN GAME PROGRAM

FIELD OF THE INVENTION

This invention relates to a method for performing a derivative scenario in a game program operated on a home television game machine, and more particularly to, a method for performing a derivative scenario in a game program which is proceeded in the process of time.

BACKGROUND OF THE INVENTION

Recently, a home television game machine which is provided with a timer is developed. Also, a personal computer game software which employs a timer function is developed.

In general, a home television game is proceeded along a story described on a program. Because of this, in a game programmed to play with a computer, when the story or patterns of the game is almost known by a player, the player will not be so interested in playing it. Particularly in a role playing game, which always proceeds along the story programmed, it will be boring when the story is almost known. To provide the game story with unexpectedness or reality, some methods are suggested in which a scenery or surrounding is given according to the real time based on the timer in the game machine or the difficulty of the game is changed by generating random numbers.

On the other hand, there are some games in which real time of clock (actual living time) is adopted, where a derivative scenario is generated at a predetermined time such as a specific date of a specific month or in a predetermined time period of a specific date to another specific date. Here, the programs of such games need to be described such that each time corresponds to each derivative scenario to generate each derivative scenario in the process of time. Therefore, if a certain event is prepared as a derivative scenario in a game every day, 366(365 days + one day in leap year) derivative scenarios will be needed in a year. Furthermore, if an hour, minute or day of the week is related to that, a huge amount of scenarios are required. For example, if derivative scenarios, as shown in FIG.1, are prepared corresponding to a month, day and time, the game requires a huge amount of scenarios.

Thus, the event must be generated at intervals of some days or with the frequency of once a month or a day at the most, since there is a limitation to the program size in the home television game machine. In typical cases, the occurrence of derivative scenario is defined on the basis of a time period such as several hours or days after from a base time.

Meanwhile, 'event' means a ceremony or affair such as a festival, a fair and washing. 'Derivative scenario' means a story for proceeding an event which is performed branching from a basic scenario. The more derivative scenarios the game has, the more various developments in the game the player can enjoy. In case of having no derivative scenario, though the game can be performed along the basic story, the process of the game becomes monotonous.

However, in the conventional game softwares in which real time of clock (actual living time) is adopted, the number of derivative scenarios is, as explained above, limited due to the limited size of the game program applicable to the home television game machine.

SUMMARY OF THE INVENTION

Accordingly, it is an object of the invention to provide a method for performing a derivative scenario in a game program in which a certain derivative scenario can be always performed in the process of real time even under the limitation on the program size applicable to a home television game machine.

According to the invention, a method for performing a plurality of derivative scenarios in a game program operated on a home television game machine, comprises the steps of:

generating the plurality of derivative scenarios in the process of real time proceeded by a timer means with which a main body or an external storage device of the home television game machine is provided; and performing the plurality of derivative scenarios such that each of the plurality of derivative scenarios circulatively changes every a time period.

BRIEF DESCRIPTION OF THE DRAWINGS

The invention will be explained in more detail in conjunction with the appended drawings, wherein.

DESCRIPTION OF THE PREFERRED EMBODIMENTS

A method for performing a derivative scenario in a game program in the preferred embodiment will be explained below.

In the embodiment, an external storage device which has a built-in RTC (real time clock) is employed. Here, RTC is an integrated circuit which has the functions of a clock and a calendar. RTC can be accessed by CPU of a game machine. RTC is backed up by a battery, therefore, even if the power of a game machine main body is shut off, it continues to tick away accurate time.

Figure 2:
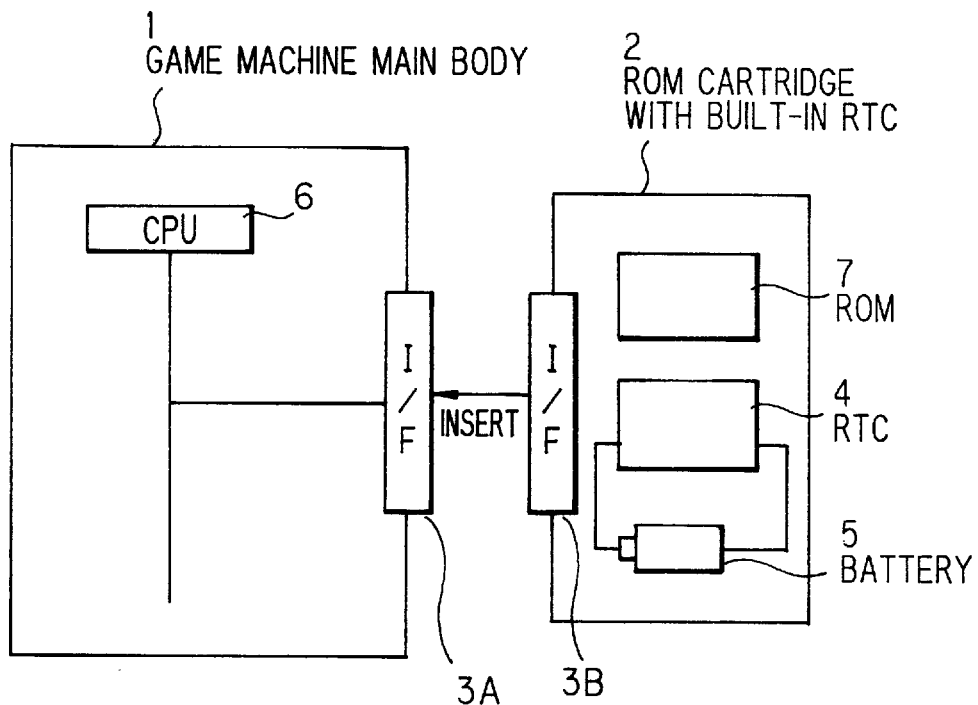
FIG.2 is a block diagram showing a ROM cartridge with the built-in RTC (real time clock) and a home television game machine which are employed in a preferred embodiment according to the invention.

FIG.2 shows a relationship between a ROM cartridge with the built-in RTC and a home television game machine. The ROM cartridge 2 with the built-in RTC is connected to the main body 1 of the game machine through interfaces 3A, 3B.

RTC 4 built in the ROM cartridge 2 automatically ticks away year, month, day, hour, minute and second or day of the week. RTC 4 is backed up by a battery 5 and ticks away independent of the game machine main body 1. CPU 6 of the game machine can read and utilize the time of RTC 4 or can renew the time of RTC. A game software is stored in ROM 7 to be transferred to RAM 10. The game machine main body 1 has ROM for storing an operation program.

In case that RTC is not built in the ROM cartridge 2, a timer means included in the main body 1 of the game machine may be used to achieve the invention.

A method for changing N derivative scenarios every time T by using the above RTC will be explained below. Here, all numerical variables to be used herein are integers more than 0. Further, since RTC ticks away a year, month, day, hour, minute, second and day of the week, a word hereinafter called 'unit' means a time unit such as a day, hour, minute and second. Also, 'a unit higher than a unit' means a unit on the left of a base unit, for example, a unit higher than a minute is a hour, day or month. A figure is taken up by time units while ten units takes up one figure in the decimal system. Besides, a base time means one second, one minute, one hour, one day etc.

At first, a minimum circulative time L is given by the following equation:

$$L = T \times N$$

where T represents a time period for which each derivative scenario is performed and N represents a number of derivative scenarios to be prepared.

Next, M is considered which gives a unit time higher than L. Here, M satisfies the next relation:

$$M = L \times I \quad (I \geq 1)$$

where I is a natural number to make M a unit time.

Since M can be expressed by the unit time, a time can be converted into the unit of L by taking out only a value which is lower than the unit time by which M is expressed and which is equal to the unit of L or more than the unit of L. Now, a value e to be converted is considered. The value e satisfies the next relation:

$$0 \leq e < M$$

On the other hand, a time E(i,n) less than M when a derivative scenario Sn ($1 \leq n \geq$) is generated is expressed as:

$$0 \leq E(i,n) < M \quad (1 \leq i \leq I)$$

which is actually expressed by the same time axis as the above value e.

Furthermore, the relationship between E(i,n) and n is expressed by the next equation:

$$n = (E(i,n) \% L)/T + 1 \ldots (1)$$

where % means an operation of giving a remainder of a division, for example, (10%8) means a remainder of 2 obtained from the division of 10 by 8.

Considering the above equation and relation, where a time is converted into e, n is obtained by the next equation:

$$n = (e L)/T + 1$$

Thus, a n-th derivative scenario Sn of N derivative scenarios can be selected and performed.

Figure 1:
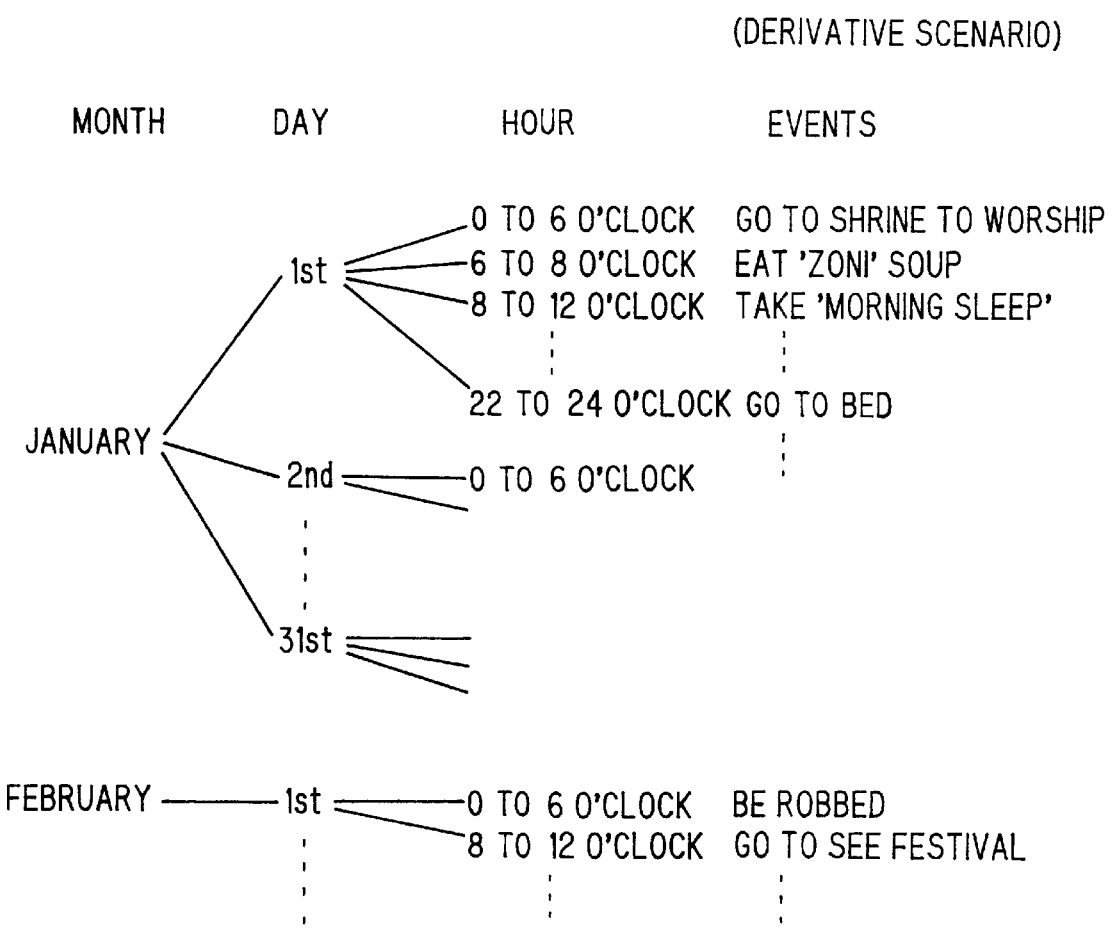
FIG.1 shows the conventional derivative scenario in which each date and time corresponds to each event.

Next, an example of this embodiment will be further in detail explained. The example takes the case that a ship has three destinations of A, B and C which change circulatively in the order of A→B→C→A... every five minutes. Herein, the derivative scenarios are, as shown in FIG.1, of the destinations of A, B and C.

TABLE 1

| n | destination |
|---|---|
| 1 | A |
| 2 | B |
| 3 | C |

Since the number of derivative scenarios to be prepared is three and the time period T for which each derivative scenario is performed is 5 (minutes), the minimum circulative time L is calculated by the next equation:

$$L = 5 \times 3 = 15 \text{(minutes)}$$

Then, considering to obtain a unit time higher than the unit of L, L is multiplied by I(=4) to give M with a unit time of 1.

$$M = 15 \times 4 = 60 \text{(minutes)} = 1 \text{(hour)}$$

Thus, the time can be compared on the basis of one hour.

When the current time (real time) in the format of 'yy' year, 'mm' month, 'dd' day, 'hh' hour, 'mm' minute, 'ss' second and 'w' day of the week is read out from RTC, e to satisfy $0 \leq e < 1$(hour) is mm (minute). Since e is equal to E in equation (1), n, which is a destination in Table 1, is determined by the next equation:

$$n = (mm 15)/5 + 1$$

For example, if mm is 50 minutes, from the value n:

$$n = (50\%15)/5 + 1 = 5/5 + 1 = 2$$

the destination is determined to be B.

Furthermore, another example of the embodiment will be explained, where provided is a circulative derivative scenario that a shop is closed only on Sundays. In this case, since a day of the week is concerned, the minimum circulative time M is one week. When each of the days of Monday to Sunday is numbered as W (corresponding to E in equation (1) ) as shown in Table 2, from the number N(=7) of derivative scenarios and the performing time cycle T(=1 (day)), n, a state of business is obtained by the next equation:

$$n = (W 7)/1 + 1$$

Thus, by preparing an open shop derivative scenario to n of 1 to 6(Monday to Saturday) and a closed shop derivative scenario to 7(Sunday), the circulative derivative scenario that a shop is closed only on Sundays can be performed.

TABLE 2

| W | day of the week |
|---|---|
| 0 | Monday |
| 1 | Tuesday |
| 2 | Wednesday |
| 3 | Thursday |
| 4 | Friday |
| 5 | Saturday |
| 6 | Sunday |
| n | state of business |
| 1 to 6 | open |
| 7 | closed |

For example, if the day in a time read out from RTC is Tuesday, where W=1 is assigned, then, n is obtained by the next equation:

$$n = (1\%7)/1 + 1 = 1/1 + 1 = 2$$

Namely, based on Table 2, a derivative scenario for Tuesday will be performed. Though, in this example, the derivative scenario can be directly selected by the value W, i.e., directly calculated as n=W+1, the other complex circulative derivative scenarios with which a day of the week and an hour are related may be prepared. In case of preparing the single open shop derivative scenario to n of 1 to 6(Monday to Saturday) as shown in Table 2, the same derivative scenario is commonly performed. In case of changing an article on sale each day of the week, it is necessary to prepare different derivative scenarios.

As explained above, by generating a limited number of circulative derivative scenario which is in advance prepared, a certain derivative scenario can be performed all the year, therefore making the content of the game more enjoyable. Moreover, since the number of derivative scenario is limited, the size of the program can be saved.

Figure 3:
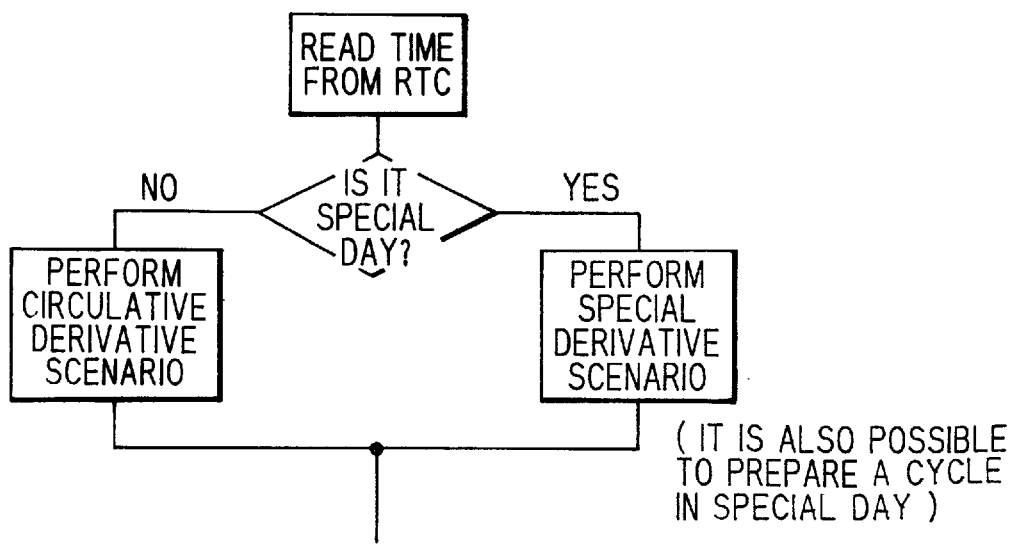
FIG.3 shows a flow chart showing a logic applicable to the preferred embodiment according to the invention.

In addition, a special derivative scenario other than the circulative derivative scenario may be performed. An example of the logic of the special derivative scenario is as shown in FIG.3.

For example, a special derivative scenario that a special Christmas sale is held on December 24 regardless of a day of the week may be prepared as a circulative derivative scenario, and it may be performed prior to the usual circulative derivative scenario. Meanwhile, a derivative scenario as held only one or two times a year has little meaning to be incorporated into a game program. Thus, such long-cycle circulative derivative scenario should be performed prior to a short-cycle derivative scenario.

Figure 4:
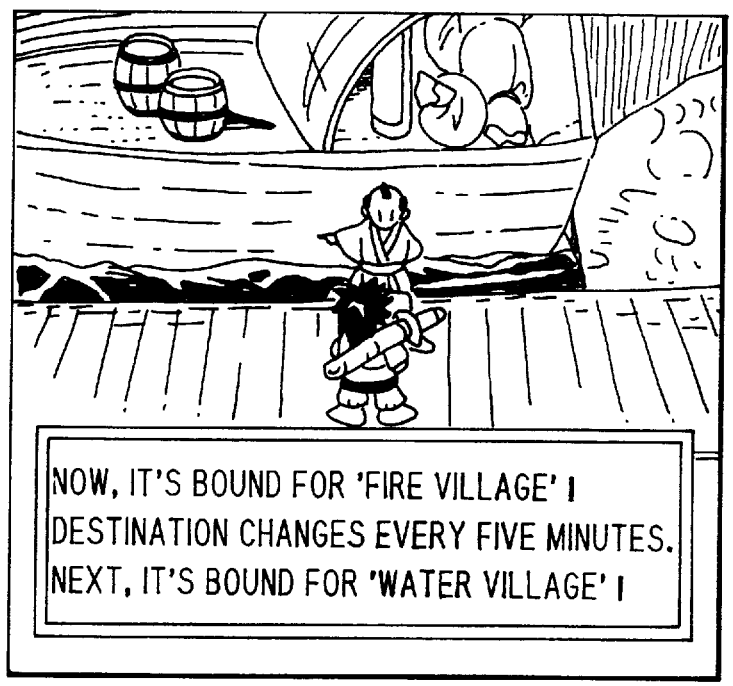
FIG.4 shows a scene of a derivative scenario in the preferred embodiment according to the invention.

FIG.4 shows a scene of the above-mentioned derivative scenario in which the destination of the ship changes every five minutes. In this scene, a boatman tells a hero "Now, it's bound for 'fire village'. The Destination changes every five minutes. Next, it's bound for 'water village'". The hero is a character for a player which can be moved by a key operation of the player. Since this game is a so-called role playing game, the player plays the hero in the game. When the hero wants to go the water village, he can kill time doing another thing while waiting, then coming back to the wharf after five minutes to get on board the ship for the water village. However, if ten minutes passed, the ship for the water village will have been started, then he must wait further ten minutes to go on board the ship for the water village. Since it is a real time that RTC ticks away, the player can play the game while looking his wrist watch or while looking at a clock which can be displayed on the television screen by a key operation of the player. In this case, it is necessary for the player to watch the time to smoothly proceed the game.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method for performing a plurality of derivative scenarios in a game program operated on a home television game machine, comprising the steps of:

generating said plurality of derivative scenarios in the process of real time proceeded by a timer means with which a main body or an external storage device of said home television game machine is provided; and performing said plurality of derivative scenarios such that each of said plurality of derivative scenarios circulatively changes every a time period.

2. A method for performing a derivative scenario, according to claim 1, wherein:

said time period is defined based on a period selected from the group consisting of a year, a month, an hour, a minute, a second and a day of the week.

3. A method for performing a derivative scenario, according to claim 1, further comprising the step of:

generating another derivative scenario with said plurality of derivative scenario;

wherein said another derivative scenario is performed prior to said plurality of derivative scenario.

4. A method for performing a derivative scenario, 1 4 according to claim 3, wherein:

said another derivative scenario is generated on a specific date or time.

5. A method for performing a derivative scenario, according to claim 3, wherein:

said another derivative scenario comprises a plurality of derivative scenarios, each of which circulatively changing every said time period.

6. A method for performing a derivative scenario, according to claim 1, wherein:

said timer means is backed up by a battery, so that said derivative scenario continues to be performed even when the power of said home television game machine is shut off.

\* \* \* \* \*